(12) United States Patent
Okada et al.

(10) Patent No.: US 12,124,712 B2
(45) Date of Patent: Oct. 22, 2024

(54) STORAGE SYSTEM

(71) Applicant: Hitachi, Ltd., Tokyo (JP)

(72) Inventors: Naoya Okada, Tokyo (JP); Kentaro Shimada, Tokyo (JP); Yuki Kotake, Tokyo (JP); Yukiyoshi Takamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/179,563

(22) Filed: Mar. 7, 2023

(65) Prior Publication Data

US 2024/0069761 A1 Feb. 29, 2024

(30) Foreign Application Priority Data

Aug. 30, 2022 (JP) .................. 2022-137068

(51) Int. Cl.
*G06F 3/06* (2006.01)
(52) U.S. Cl.
CPC .......... *G06F 3/0625* (2013.01); *G06F 3/0655* (2013.01); *G06F 3/0679* (2013.01)
(58) Field of Classification Search
CPC ........ G06F 3/0625; G06F 3/06; G06F 3/0655; G06F 3/0679
See application file for complete search history.

(56) References Cited

U.S. PATENT DOCUMENTS

| 8,751,836 | B1 * | 6/2014 | Piszczek | G06F 1/3268 |
| | | | | 713/320 |
| 8,959,374 | B2 * | 2/2015 | Miller | G06F 1/3203 |
| | | | | 713/323 |
| 9,454,205 | B1 * | 9/2016 | Allen-Ware | G06F 3/0652 |
| 10,254,985 | B2 * | 4/2019 | Geml | G06F 3/0634 |
| 11,144,105 | B2 * | 10/2021 | Jenne | G06F 1/3296 |
| 2016/0346922 | A1 * | 12/2016 | Shelton | H02J 7/0013 |
| 2017/0093325 | A1 * | 3/2017 | Nozawa | H02M 7/48 |
| 2019/0050040 | A1 * | 2/2019 | Baskaran | G06N 3/063 |

(Continued)

FOREIGN PATENT DOCUMENTS

WO 2018/193608 A1 10/2018

OTHER PUBLICATIONS

A. Bogliolo, L. Benini, E. Lattanzi and G. De Micheli, "Specification and analysis of power-managed systems," in Proceedings of the IEEE, vol. 92, No. 8, pp. 1308-1346, Aug. 2004.*

(Continued)

*Primary Examiner* — Pierre Michel Bataille
(74) *Attorney, Agent, or Firm* — Volpe Koenig

(57) ABSTRACT

A storage system includes a storage controller and a plurality of storage drives. The storage controller holds power management information for managing power supplied to the storage system and power consumption of an operating mounted device of the storage system, and definition information for defining a relationship between power states and power consumption of the plurality of storage drives. The storage controller determines a power budget that can be supplied to the plurality of storage drives, based on the power management information according to a change in a configuration of the storage system, and determines a power state of each of the plurality of storage drives based on the power budget and the definition information.

10 Claims, 13 Drawing Sheets

(56) References Cited

U.S. PATENT DOCUMENTS

| | | | |
|---|---|---|---|
| 2019/0170526 A1* | 6/2019 | Ando | G01C 21/3469 |
| 2019/0227725 A1* | 7/2019 | Afriat | G06F 3/0683 |
| 2019/0272012 A1* | 9/2019 | Kachare | G06F 1/3268 |
| 2020/0042068 A1* | 2/2020 | Rong | G06F 1/3203 |
| 2021/0109587 A1* | 4/2021 | Mukker | G06F 1/206 |
| 2023/0141475 A1* | 5/2023 | Li | G06F 1/3296 |
| | | | 713/320 |
| 2023/0367379 A1* | 11/2023 | Vaysman | G06F 13/1668 |

OTHER PUBLICATIONS

R. Khamamkar and A. Keswani, "Analyzing Power Management in Non-Volatile Memory Express (NVMe) Solid State Drives," 2019 IEEE Pune Section International Conference (PuneCon), Pune, India, 2019, pp. 1-4.*

* cited by examiner

FIG. 2

POWER STATE DEFINITION TABLE GROUP 200

| POWER STATE | ACTIVE POWER | IDLE POWER | MAX POWER | RELATIVE READ PERFORMANCE | RELATIVE WRITE PERFORMANCE | RELATIVE READ LATENCY | RELATIVE WRITE LATENCY |
|---|---|---|---|---|---|---|---|
| 0 | 20 | 5 | 25 | 1 | 1 | 1 | 1 |
| 1 | 18 | 4 | 20 | 0.8 | 0.8 | 0.8 | 0.8 |
| 2 | 15 | 3 | 18 | 0.7 | 0.7 | 0.7 | 0.7 |
| 3 | 12 | 2 | 15 | 0.5 | 0.5 | 0.5 | 0.5 |
| 4 | NULL | NULL | NULL | NULL | NULL | NULL | NULL |
| ... | ... | ... | ... | ... | ... | ... | ... |
| 31 | NULL | NULL | NULL | NULL | NULL | NULL | NULL |

DEVICE ID: F1

210

| POWER STATE | ACTIVE POWER | IDLE POWER | MAX POWER | RELATIVE READ PERFORMANCE | RELATIVE WRITE PERFORMANCE | RELATIVE READ LATENCY | RELATIVE WRITE LATENCY |
|---|---|---|---|---|---|---|---|
| 0 | 18 | 4 | 20 | 1 | 1 | 1 | 1 |
| 1 | 15 | 3 | 18 | 0.8 | 0.8 | 0.8 | 0.8 |
| 2 | 12 | 2 | 15 | 0.7 | 0.7 | 0.7 | 0.7 |
| 3 | 11 | 2 | 13 | 0.5 | 0.5 | 0.5 | 0.5 |
| 4 | 10 | 2 | 12 | 0.4 | 0.4 | 0.4 | 0.4 |
| ... | ... | ... | ... | ... | ... | ... | ... |
| 31 | NULL | NULL | NULL | NULL | NULL | NULL | NULL |

DEVICE ID: G1

| MOUNTING POSITION 251 | DEVICE ID 252 | AVAILABLE POWER STATE 253 | CURRENT POWER STATE 254 | CURRENT AVERAGE POWER CONSUMPTION 255 | CURRENT MAXIMUM POWER CONSUMPTION 256 |
|---|---|---|---|---|---|
| 0 | F1 | 0,1,2,3 | 0 | 20W | 25W |
| 1 | F2 | 0,1,2,3 | 0 | 20W | 25W |
| 2 | F3 | 0,1,2,3 | 0 | 20W | 25W |
| 3 | G1 | 0,1,2,3,4,5 | 0 | 18W | 20W |
| 4 | G2 | 0,1,2,3,4,5 | 0 | 18W | 20W |
| 5 | NULL | NULL | NULL | NULL | NULL |
| ... | ... | ... | ... | ... | ... |
| 24 | NULL | NULL | NULL | NULL | NULL |

| ITEM NUMBER | MOUNTED DEVICE | MOUNTING POSITION | DEVICE ID | ACTIVE/ INACTIVE STATE | POWER CONSUMPTION |
|---|---|---|---|---|---|
| 0 | POWER SOURCE | 0 | X | ACTIVE | 1800W |
| 1 | POWER SOURCE | 1 | Y | ACTIVE | 1800W |
| 2 | HOST I/F | 0 | A | ACTIVE | 50W |
| 3 | HOST I/F | 1 | B | ACTIVE | 60W |
| 4 | HOST I/F | 2 | NULL | INACTIVE | 0W |
| ... | ... | ... | ... | ... | ... |
| 10 | CPU | 0 | C1 | ACTIVE | 100W |
| 11 | CPU | 1 | C2 | ACTIVE | 100W |
| 12 | CPU | 2 | C3 | ACTIVE | 100W |
| 13 | CPU | 3 | C4 | ACTIVE | 100W |
| ... | ... | ... | ... | ... | ... |
| 20 | MEMORY | 0 | D1 | ACTIVE | 10W |
| 21 | MEMORY | 1 | D2 | ACTIVE | 10W |
| 22 | MEMORY | 2 | D3 | ACTIVE | 10W |
| ... | ... | ... | ... | ... | ... |
| 30 | FAN | 0 | E1 | ACTIVE | 40W |
| 31 | FAN | 1 | E2 | ACTIVE | 40W |
| ... | ... | ... | ... | ... | ... |
| 40 | DRIVE | 0 | F1 | ACTIVE | 25W |
| 41 | DRIVE | 1 | F2 | ACTIVE | 25W |
| 42 | DRIVE | 2 | NULL | INACTIVE | 0W |
| ... | ... | ... | ... | ... | ... |

FIG. 12

| MOUNTING POSITION 401 | DEVICE ID 402 | AVAILABLE POWER STATE 403 | CURRENT POWER STATE 404 | CURRENT AVERAGE POWER CONSUMPTION 405 | CURRENT MAXIMUM POWER CONSUMPTION 406 | MAXIMUM READ PERFORMANCE 407 | MAXIMUM WRITE PERFORMANCE 408 | READ LATENCY 409 | WRITE LATENCY 410 |
|---|---|---|---|---|---|---|---|---|---|
| 0 | A1 | 1,2,3,4,5 | 1 | 20W | 25W | 200MB/S | 200MB/S | 100US | 100US |
| 1 | A2 | 1,2,3,4,5 | 1 | 20W | 25W | 200MB/S | 200MB/S | 100US | 100US |
| 2 | A3 | 1,2,3,4,5 | 1 | 20W | 25W | 200MB/S | 200MB/S | 100US | 100US |
| 3 | B1 | 1,2,3,4,5,6,7 | 3 | 12W | 15W | 100MB/S | 100MB/S | 200US | 200US |
| 4 | B2 | 1,2,3,4,5,6,7 | 3 | 12W | 15W | 100MB/S | 100MB/S | 200US | 200US |
| 5 | NULL | NULL | NULL | NULL | NULL | NULL | NULL | NULL | NULL |
| ... | ... | ... | ... | ... | ... | | | | |

400

STORAGE SYSTEM

CLAIM OF PRIORITY

The present application claims priority from Japanese patent application JP 2022-137068, filed on Aug. 30, 2022, the content of which is hereby incorporated by reference into this application.

BACKGROUND OF THE INVENTION

1. Field of the Invention

The present invention relates to a storage system.

2. Description of the Related Art

There is an increasing demand for drives that achieve higher performance and higher recording densities in storage systems. Flash drives and solid state drives (SSD) that use NAND flash memories have been reduced in price and increased in capacity due to high integration of the NAND flash memories. As a result, even storage systems that have conventionally used hard disk drives (HDDs) include a product in which an SSD is mounted instead of an HDD.

As the performance of storage drives is improved, the power consumption of the storage drives increases and accounts for most of the power consumption of an entire storage system. For this reason, for example, WO 2018/193608 A discloses a technique for controlling power of a storage drive.

SUMMARY OF THE INVENTION

Storage systems have power constraints due to mounting environments of power source equipment, air conditioning equipment, and the like, mountable power source units, cooling performance for discharging heat generated due to power consumption, and the like. In addition, since the demand for higher performance of the storage systems is increasing year by year, it is required to achieve both high storage system performance and power saving.

A storage system according to an aspect of the present invention includes a storage controller and a plurality of storage drives, and the storage controller holds power management information for managing power supplied to the storage system and power consumption of an operating mounted device of the storage system, and definition information for defining a relationship between power states and power consumption of the plurality of storage drives. The storage controller determines a power budget that can be supplied to the plurality of storage drives, based on the power management information according to a change in a configuration of the storage system, and determines a power state of each of the plurality of storage drives based on the power budget and the definition information.

According to one aspect of the present invention, it is possible to implement appropriate power control of the storage system.

BRIEF DESCRIPTION OF THE DRAWINGS

FIG. 2 illustrates an example of a configuration of a power state definition table group;

FIG. 3 illustrates an example of a configuration of a drive power management table;

FIG. 4 illustrates an example of a configuration of a storage system power management table;

FIG. 12 illustrates an example of a configuration of a drive power management table according to Example 2.

DETAILED DESCRIPTION

Figure 1:
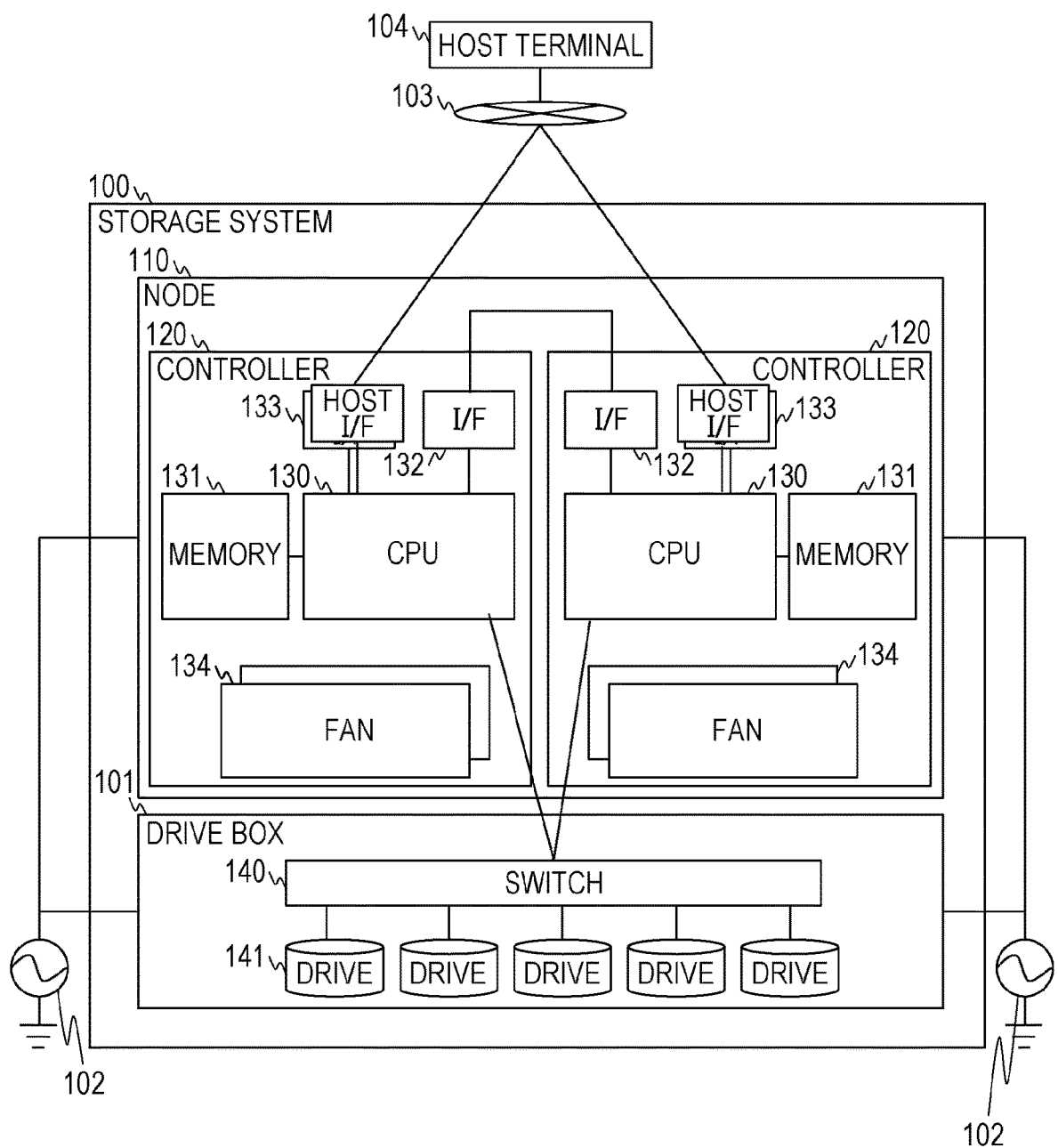
FIG. 1 is a diagram illustrating an example of a configuration of a computer system according to Example 1.

Hereinafter, embodiments of the present invention will be described with reference to the drawings. Note that, in the following description, various types of information may be described with expressions such as a "management table", but the various types of information may be expressed with data structures other than tables. In addition, the "management table" can be referred to as "management information" to indicate that it does not depend on the data structure.

A program is executed by one or more processors, for example, one or more central processing units (CPUs), and performs predetermined processing. Note that, since the processing is appropriately performed using a storage resource (for example, a memory) and a communication interface device (for example, a communication port), the subject of the processing may be a processor. The processor may have dedicated hardware in addition to a CPU. The computer program may be installed in each computer from a program source. The program source may be provided by, for example, a program distribution server or a storage medium.

Each element can be identified by a number or the like, but another type of identification information such as a name may be used as long as the identification information can be identified. In the drawings and the description of the present invention, the same parts are denoted by the same reference numerals, but the present invention is not limited to Examples, and all application examples that conform to the idea of the present invention are included in the technical scope of the present invention. Unless otherwise specified, each component may be singular or plural.

Example 1

FIG. 1 is a diagram illustrating an example of a configuration of a computer system according to Example 1. The computer system includes a storage system 100, a drive box 101, and a host terminal 104. The host terminal 104 is connected to the storage system 100 via a network 103.

The configuration of the computer system illustrated in FIG. 1 is an example, and is not limited thereto. For example, a storage system in which the storage system 100 and the drive box 101 are integrated may be used. In addition, the host terminal 104 and the storage system 100 may constitute a hyper-converged system tightly coupled by hardware and software.

The network 103 is, for example, a storage area network (SAN), a local area network (LAN), or a wide area network (WAN). A connection method of the network 103 may be either wireless connection or wired connection.

The host terminal 104 executes an application and issues commands such as a read command and a write command to the storage system 100. Although not illustrated, the host terminal 104 is a computer including an interface for connecting to the storage system 100, a central processing unit (CPU), a memory, and the like.

The drive box 101 is a device that accommodates a plurality of storage drives (storage devices) 141. The drive box 101 includes a switch 140 and a plurality of storage drives 141. The plurality of storage drives 141 may form a redundant arrays of independent disks (RAID) group. The storage system 100 may generate, on the RAID group, a logical unit (LU) as a storage area to be provided to the host terminal 104.

All or some of the storage drives 141 in the drive box 101 may constitute a distributed RAID group. The distributed RAID is a technology of managing a stripe sequence including data (D) and redundant data or parity (P) for restoring the data by distributing the stripe sequence to a plurality of storage drives more than m+n defined by a data protection policy (men). In the distributed RAID, a data transfer process is performed with a plurality of storage drives in parallel at the same time, so that it is possible to shorten a processing time associated with addition or removal of a storage drive.

The switch 140 connects CPUs 130A and 130B included in controllers 120 of the storage system 100 to the storage drives 141. The controllers 120A and 120B are also referred to as storage controllers 120A and 120B. The CPUs 130A and 130B are arithmetic units. Each controller 120 can access the storage drives 141 via the switch 140. In Example 1, the CPUs 130A and 130B are connected to the switch 140 via a PCIe bus (PCIe and PCI Express are registered trademarks). In addition, the storage drives 141 are connected to the switch 140 via a PCIe bus.

The switch 140 includes a plurality of ports connected to the storage drives 141. The switch 140 expands the number of ports of the PCIe bus. The switch 140 may be omitted, and the storage drives 141 may be directly connected to the CPUs 130A and 130B.

The storage drives 141 are devices that provide a storage area used by the host terminal 104. The storage drives 141 according to Example 1 are typically Non-Volatile Memory Host Controller Interface (NVMe) drives that communicate with the CPUs via the PCIe bus and perform processing in accordance with the NVMe protocol (NVMe and NVM express are registered trademarks). The storage drives 141 may include a serial attached SCSI (SAS and Serial Attached SCSI are registered trademarks) drive or the like.

For example, highly available dual-port NVMe solid state drives (SSDs) can be used as the storage drives 141. Each of the SSDs is a nonvolatile semiconductor drive in which a NAND flash memory is mounted as a nonvolatile storage area. Note that the protocol and the communication path of the storage drives 141 are not limited, and the storage drives 141 may be connected to a communication path such as Ethernet other than the PCIe bus as long as the storage drives 141 can read and write data from and to memories of a plurality of nodes 110.

The storage system 100 provides the storage area to the host terminal 104. The storage system 100 can include a plurality of nodes 110 and is connected to the drive box 101. FIG. 1 illustrates one of the nodes 110 as an example. The node 110 is a device that controls the storage system 100, and includes one or more storage controllers.

In the configuration example illustrated in FIG. 1, two storage controllers 120 are included in the storage node 110. The number of storage controllers may be one or three or more. Each of the storage controllers 120 includes a CPU 130, a memory 131, an interface (interface circuit) 132 between the storage controllers, and a host interface 133.

The CPU 130 executes a program stored in the memory 131. The CPU 130 performs processing according to the program to operate as a functional unit that implements a specific function.

The memory 131 is a storage device including at least one of a volatile storage element such as a dynamic random access memory (DRAM) and nonvolatile storage elements such as a NAND flash memory, a spin transfer torque random access memory (STT-RAM), and a phase-change memory (PCM). A storage area for storing the program to be executed by the CPU 130 and various types of information and a storage area for temporarily storing host data are set in the memory 131.

The interface 132 is an interface for communication between the storage controllers. The interface 132 is connected to the other storage controller via the PCIe bus. In the configuration example illustrated in FIG. 1, each storage controller 120 includes an interface 132. The interface 132 may be mounted only in one storage controller 120.

The host interface 133 is an interface for connecting to the host terminal 104. The host interface 133 is an Ethernet adapter (Ethernet is a registered trademark), an InfiniBand adapter (InfiniBand is a registered trademark), a host bus adapter, a PCI Express bridge, or the like.

The storage controller 120 further includes one or more cooling fans 134. Hereinafter, the cooling fans are also simply referred to as fans. In the configuration example illustrated in FIG. 1, a plurality of fans 134 are disposed in each storage controller 120. The fans 134 cool the CPU 130, the memory 131, the host interface 133, and the inter-controller interface 132 in the storage controller 120, and the storage drives 141 of the drive box 101.

For example, it is assumed that the drive box 101 is arranged on the front side of the storage system 100 and that the host interface 133 is arranged on the back side of the storage system 100. A gap is present between the drive box 101 and the storage controller 120, and air from the fans 134 passes through the gap. For example, the fans 134 generate an air flow from the front surface of the storage system 100 toward the back surface of the storage system 100 to cause the storage system 100 to be ventilated and discharge heat. Each of the fans 134 may be disposed at any position. For example, the fans 134 may be disposed in the drive box 101. In addition, the number of fans of each storage controller 120 is also arbitrary.

In the example described below, the structures and performances of the fans 134 are common, but fans 134 having different structures and performances may be mounted. In such a configuration, information indicating cooling performance of the fans may be managed.

The storage system 100 operates with power supplied from a power source (power source circuit) 102. The power source is redundant. In the configuration example illustrated in FIG. 1, two power sources 102 supply power to the storage system 100, that is, to the storage controllers 120 and the drive box 101. When one power source 102 fails, power supplied to the storage system 100 is halved. The storage system 100 can maintain the operating state by reducing the power consumption. Note that the number of power sources 102 is arbitrary.

Hereinafter, an example of the management information held by each storage controller 120 will be described. The management information is stored in, for example, a non-volatile storage drive (not illustrated) in the drive box 101 or in each storage controller 120, and is loaded into each memory 131.

FIG. 2 illustrates an example of a configuration of a power state definition table group 200. The power state definition table group 200 includes a plurality of power state definition tables 210, and each power state definition table 210 manages a power state definition of one corresponding storage drive 141. In this example, one power state definition table 210 is prepared for each storage drive 141. In another example, one power state definition table may be held for a group of a plurality of storage drives 141 in which the same power state is defined.

The power state definition tables 210 are stored in, for example, the storage drives 141, and the storage controllers 120 hold the power state definition tables 210 acquired from the storage drives 141. The power state definition tables 210 may be registered by a system administrator.

FIG. 2 illustrates, by way of example, two power state definition tables 210 describing power state definitions for a storage drive 141 with a device ID F1 and a storage drive 141 with a device ID G1. As will be described later, a device ID is assigned to each storage device 141 and uniquely specifies the storage drive 141.

Each of the power state definition tables 210 includes a power state field 211, an active power field 212, an idle power field 213, a maximum power field 214, a relative read performance field 215, a relative write performance field 216, a relative read latency field 217, and a relative write latency field 218.

The power state field 211 indicates a number for identifying a power state of the storage drive 141. The active power field 212 indicates average power consumption in each power state when the storage drive 141 is active (normal operation state). The idle power field 213 indicates average power consumption in each power state when the storage drive 141 is in an idle state.

The maximum power field 214 indicates the maximum power consumption in each power state. The relative read performance field 215 indicates a relative value of the read performance in each power state. The relative write performance field 216 indicates a relative value of the write performance in each power state. The relative read latency field 217 indicates a relative value of latency in read processing in each power state. The relative write latency field 218 indicates a relative value of latency in write processing in each power state.

A smaller number in the power state field 211 indicates a state (level) of the storage drive 141 with higher power consumption and higher performance. Larger numbers in the relative read latency field 217 and the relative write latency field 218 indicate that the latency is shorter.

FIG. 3 illustrates an example of a configuration of a drive power management table 250. The drive power management table 250 manages the current power state of each storage drive 141. The drive power management table 250 includes a mounting position field 251, a device ID field 252, an available power state field 253, a current power state field 254, a current average power consumption field 255, and a current maximum power consumption field 256.

The mounting position field 251 indicates a slot position in the drive box 101 in which each storage drive 141 is mounted. The device ID field 252 indicates an ID of each storage drive 141. The available power state field 253 indicates a power state that can be set in each storage drive 141. A value in the available power state field 253 indicates a power state defined as a settable state (record other than null) in each power state definition table 210.

The current power state field 254 indicates a currently set power state of each storage drive 141. In this example, the power states of all the storage drives 141 in the drive box 101 are common. As a result, it is possible to achieve both reduction in power consumption of the switch 140 and high performance of the switch 140. Note that different storage drives 141 may be set to different power states. For example, storage drives 141 of the same model number may be set to the same power state, and storage drives 141 of different model numbers may include storage drives set to different power states.

The current average power consumption field 255 indicates the current average power consumption of each storage drive 141. A value indicated in the current average power consumption field 255 matches a value in the current power state in the active power field 212 of the corresponding power state definition table 210. The current maximum power consumption field 256 indicates the current maximum power consumption of each storage drive 141. A value indicated in the current maximum power consumption field 256 matches a value in the current power state in the maximum power field 214 of the corresponding power state definition table 210.

FIG. 4 illustrates an example of a configuration of a storage system power management table 300. The system power management table 300 manages power consumption of the devices mounted in the storage system 100. The mounted devices include the host interfaces, the CPUs, the memories, the fans, the storage drives, and the like. In this case, the power source 102 is included to manage power supplied to the storage system 100 and is excluded from the devices mounted in the storage system 100. It is assumed that a destination to which power is supplied from the power source 102 is only the storage system 100.

The system power management table 300 includes an item number field 301, a mounted device field 302, a mounting position field 303, a device ID field 304, an active/inactive state field 305, and a power consumption field 306. The item number field 301 indicates a record identifier of the system power management table 300.

The mounted device field 302 indicates a type of each device mounted in the storage system 100. The mounting position field 303 indicates a mounting position which is among mounting positions defined for the types of the mounted devices and at which each device is mounted in the storage system 100. The mounting position of each storage drive 141 matches the mounting position indicated in the mounting position field 251 of the drive power management table 250. A value in the mounting position field 303 indicates, for example, a combination of each storage controller and a slot on which each component of the storage controller is mounted.

The device ID field 304 indicates an ID for uniquely identifying each device. The active/inactive state field 305 indicates whether each device is mounted and operating (active), or is not mounted or is stopped (inactive). Each storage controller 120 may monitor the active/inactive state of each device. When the active/inactive state of each device is monitored, "inactive" indicates that the device is not mounted or is stopped. When the active/inactive state of each device is not monitored, "inactive" indicates that the device is not mounted.

The power consumption field 306 indicates the maximum power consumption of each device. As discussed above, the maximum power consumption of each storage drive 141 depends on its current power state. Some types of devices other than storage drives 141 may have multiple power states, like the storage drives 141. For example, the CPUs 130 may have a normal mode in which the CPUs 130 operate at a normal frequency and a high-performance mode in which the CPUs 130 operate at a frequency higher than the normal frequency. The system power management table 300 indicates the maximum power in the power state in which the maximum power is consumed for the devices other than the storage drives 141. The power consumption of the power source 102 indicates power supplied by the power source 102.

The operation of the CPUs 130 in the high-performance mode can improve the performance of the storage system. Power control of the storage drives that consume most of the power consumption of the storage system and improvement of the core frequency of the CPUs that determine the performance of the storage system can achieve both power saving and high performance of the storage system.

Next, an example of a power control process for addition of a storage drive to the storage system 100 will be described. The storage system 100 determines the power states of the storage drive 141 to be added and the existing storage drives 141 according to the addition of the storage drive 141. Appropriate power control can be performed according to the addition of the storage drive. For example, the storage system 100 determines whether or not it is necessary to change the power states of the existing storage drives 141 according to the addition of the storage drive 141, and changes the power states to a power state with lower power consumption if necessary. As a result, performance degradation is suppressed while maintaining the operation of the storage system 100.

Figure 5:
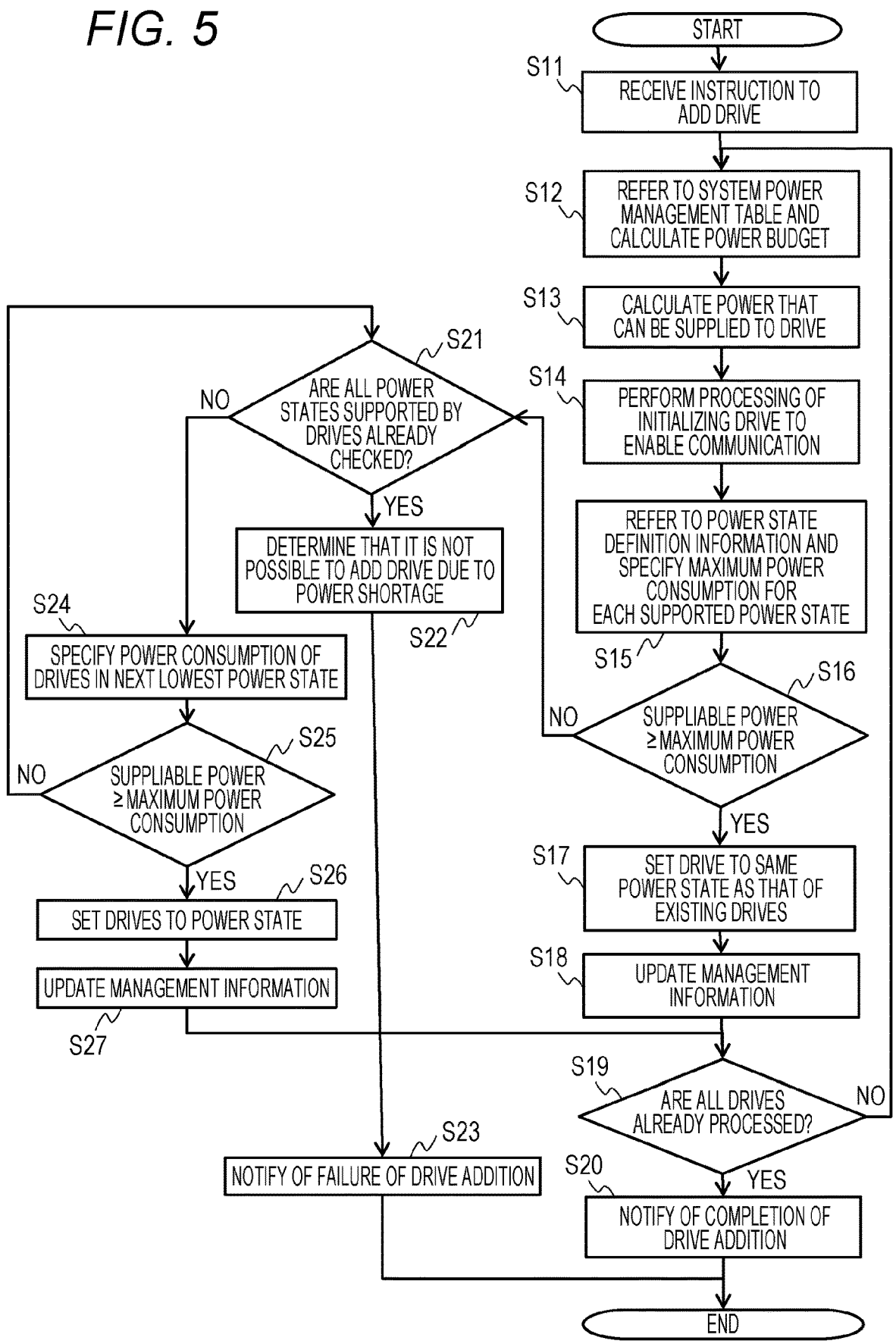
FIG. 5 is a flowchart of an example of a process to be performed by a storage controller for addition of a storage drive.

FIG. 5 is a flowchart of an example of a process to be performed by the storage controller 120 for addition of a storage drive. The CPU 130 receives an instruction to add a drive from a user via a management terminal (not illustrated), for example (S11). The instruction to add the drive specifies, for example, a position where the storage drive to be added is to be mounted. The number of specified positions indicates the number of storage drives 141 to be added.

Next, the CPU 130 refers to the system power management table 300, and calculates a power budget of the storage system 100 that can be supplied to all the storage drives 141. The calculation of the power budget is based on the total power supplied from the power source 102, the total power consumption of operating (active) mounted devices other than the storage drives 141, and the total number of fans 134 operating. The number of fans 134 may not be referred to.

Although the structures and performances of the fans 134 are common, fans 134 having different performances may be included. The storage controller 120 may refer to the performance of each fan and calculate the power budget based on the total performance of all the fans. In this manner, the power budget is determined based on the configuration of the fans.

The calculation of the power budget is determined such that the total power consumption of operating mounted devices other than the storage drives 141 is equal to or less than the total power supplied. In addition, the power budget is determined such that the amount of heat generated by all the mounted devices operating in the storage system 100 including the storage drives 141 is equal to or less than an upper limit value defined for each of the numbers of operating fans 134. The relationship between the amount of heat generated and the (maximum) power consumption may be defined for each device, or the relationship between the power consumption of all the mounted devices and the total amount of heat generated may be defined. An upper limit value of the amount of generated heat according to the number of operating fans may be represented by an upper limit value of the total power consumption of the storage system 100.

For example, each CPU 130 can determine the power budget as follows. It is assumed that the system power management table 300 stores information of all the mounted devices to which power can be supplied from the registered power source 102. In the configuration example illustrated in FIG. 1, destinations to which power is supplied from the two power sources 102 are the two storage controllers 120 and the drive box 101.

The CPU 130 determines the sum of the power consumption of the power sources 102 whose active/inactive states are "active" as suppliable power. In the system power management table 300 illustrated in FIG. 4, the power consumption field 306 indicates that power consumption of "inactive" devices is 0 W. Therefore, the CPU 130 refers to the power consumption field 306 and calculates the sum of values indicated in the power consumption field 306 and in records in which the mounted device field 302 indicates the power sources.

Further, the CPU 130 calculates the sum of the power consumption of the devices that are not the storage drives 141 and whose active/inactive states are "active". As described above, the CPU 130 refers to the power consumption field 306 and calculates the sum of the values indicated in the power consumption field 306 and in records in which the mounted device field 302 indicates values different from those indicating the power sources and the drives. The CPU 130 subtracts the sum of the power consumption of the devices other than the storage drives from the suppliable power, and determines the value obtained by the subtraction as the power budget that can be supplied to all the storage drives 141 from the viewpoint of the power supplied and the power consumption.

Further, the CPU 130 determines the power budget from the viewpoint of the amount of heat generated. The CPU 130 refers to the system power management table 300 to determine the number of operating fans, and determines a heat generation upper limit corresponding to the determined number of fans from the management information held in advance. Further, the CPU 130 calculates the amount of heat generated by each of the devices other than the storage drives 141 from the value of each device indicated in the power consumption field 306 and the information held in advance, and calculates the sum of the amounts of heat generated by the devices.

The CPU 130 subtracts the sum of the amounts of heat generated by the devices other than the storage drives 141 from the heat generation upper limit determined based on the number of operating fans to determine an allowable amount of heat to be generated by the storage drives 141. The CPU 130 determines the power budget for the storage drives 141 from the viewpoint of the amount of generated heat from the allowable amount of heat to be generated and the information held in advance.

The CPU 130 compares the power budget from the viewpoint of the power supplied and the power consumption with the power budget from the viewpoint of the amount of heat generated, and determines a smaller power budget as the final power budget for the storage drives 141.

Next, the CPU 130 calculates power that can be supplied to the selected one storage drive 141 (target storage drive 141) to be added (S13). The CPU 130 subtracts the sum of the power consumption of existing storage drives 141 whose active/inactive states are "active" from the power budget, and determines the value obtained by the subtraction as power that can be supplied to the target storage drives 141.

Next, the CPU 130 performs processing of initializing the target storage drive 141 to enable communication with the target storage drive 141 (S14). Further, the CPU 130 reads information to be included in the power state definition table 210 from the target storage drive 141, and specifies the maximum power consumption for each supported power state (S15).

The CPU 130 compares power that can be supplied to the target storage drive 141 with the maximum power consumption of the target storage drive 141 (S16). The maximum power consumption compared in this case is the maximum power consumption in the same power state as the power state in which the existing storage drives 141 are set. In this example, all the existing storage drives 141 are set to a common power state. As a result, it is possible to improve the performance of the drive box 101 while reducing the power consumption.

When the suppliable power is equal to or greater than the maximum power consumption of the target storage drive 141 in the current power state of the existing storage drives 141 (S16: YES), the CPU 130 sets the power state of the target storage drive 141 to be added to the same power state as the power state of the other existing storage drives 141 (S17).

It is assumed that the power state of the existing storage drives 141 is set to a power state with the maximum power consumption within the power budget before the addition of the drive. When the new storage drive 141 does not support the current power state of the existing storage drives 141, the CPU 130 notifies the user that the addition of the drive has failed as described in step S23.

Next, the CPU 130 updates the management information with information of the added storage drive 141 (S18). Specifically, the CPU 130 adds the information of the new storage drive 141 to the power state definition table group 200, the drive power management table 250, and the system power management table 300. When an unprocessed storage drive is present among storage drives 141 for which the addition instruction has been received (S19: NO), the CPU 130 resumes the process from step S12. When all the storage drives 141 for which the addition instruction has been received are completely processed (S19: YES), the CPU 130 notifies the management device of the completion of the process of adding the storage drives (S20).

When the suppliable power is less than the maximum power consumption of the target storage drive 141 in the current power state of the existing storage drives 141 in step S16 (S16: NO), the CPU 130 determines whether or not it has been checked whether or not a storage drive can be added for all the power states supported by the existing and target storage drives 141 (S21).

When all the power states have been checked (S21: YES), the CPU 130 determines that the target storage drive 141 cannot be added to the storage system 100 due to power shortage (S22), and notifies the user that the addition of the drive has failed (S23). For example, the failure notification is notified to the management terminal and displayed on the management terminal.

When an unchecked power state remains (S21: NO), the CPU 130 specifies the maximum power consumption of the existing and target storage drives 141 in the second lowest power state (power state number larger by one) (S24). Information of the power of the existing storage drives 141 is described in the power state definition table group 200.

The CPU 130 subtracts the sum of the maximum power consumption in the second lowest power state of the existing storage drives 141 from the system power budget calculated in step S12, and calculates power that can be supplied to the added target storage drive 141. Further, the CPU 130 compares the suppliable power with the maximum power consumption of the target storage drive 141 in the second lowest power state (S25).

When the suppliable power is less than the maximum power consumption (S25: NO), the process returns to step S21. When the suppliable power is greater than or equal to the maximum power consumption (S25: YES), the CPU 130 sets the existing and target storage drives 141 to the power state selected in step S24 (S26).

The CPU 130 updates the management information with information of the new power state of the existing storage drives 141 and information of the added storage drive 141 (S27). Specifically, the CPU 130 updates the drive power management table 250 and the system power management table 300 with the information of the new power state of the existing storage drives 141. Further, the information of the added storage drive 141 is added to the power state definition table group 200, the drive power management table 250, and the system power management table 300. Thereafter, the process proceeds to step S19.

In the above-described example of the process, the power states of the storage drives 141 after the addition of the storage drive are set to a power state in which the power consumption is the highest within the power budget, that is, the highest performance is exhibited. As a result, it is possible to achieve both low power consumption and high storage performance.

As described above, the power consumption states of the storage drives are defined according to the number of mounted storage drives in response to the addition of a storage drive, and the power consumption control is performed according to the number of mounted storage drives. When the number of mounted storage drives is small, the storage drives are operated in a high-performance high-power state, and when the number of mounted storage drives is increased, the storage drives are shifted to a low-power state so as not to exceed the design power. By reducing the power of the storage drives, throughput performance of each storage drive may be reduced, and latency may be increased. For example, the CPU secures the power to operate in the high-performance mode and increases the operating frequency of the CPU, so that the processing time in the storage controller can be reduced and the performance degradation of the entire storage system can be suppressed.

Next, an example of a power control process for removal of a storage drive of the storage system 100 will be described. The storage system 100 determines the power states of remaining storage drives 141 according to the removal of a storage drive 141. Appropriate power control can be performed according to the removal of the storage drive. For example, the storage system 100 changes the power state to a power state with higher power consumption according to the removal of the storage drive 141 if possible. As a result, the performance of the storage system 100 can be improved.

Figure 6:
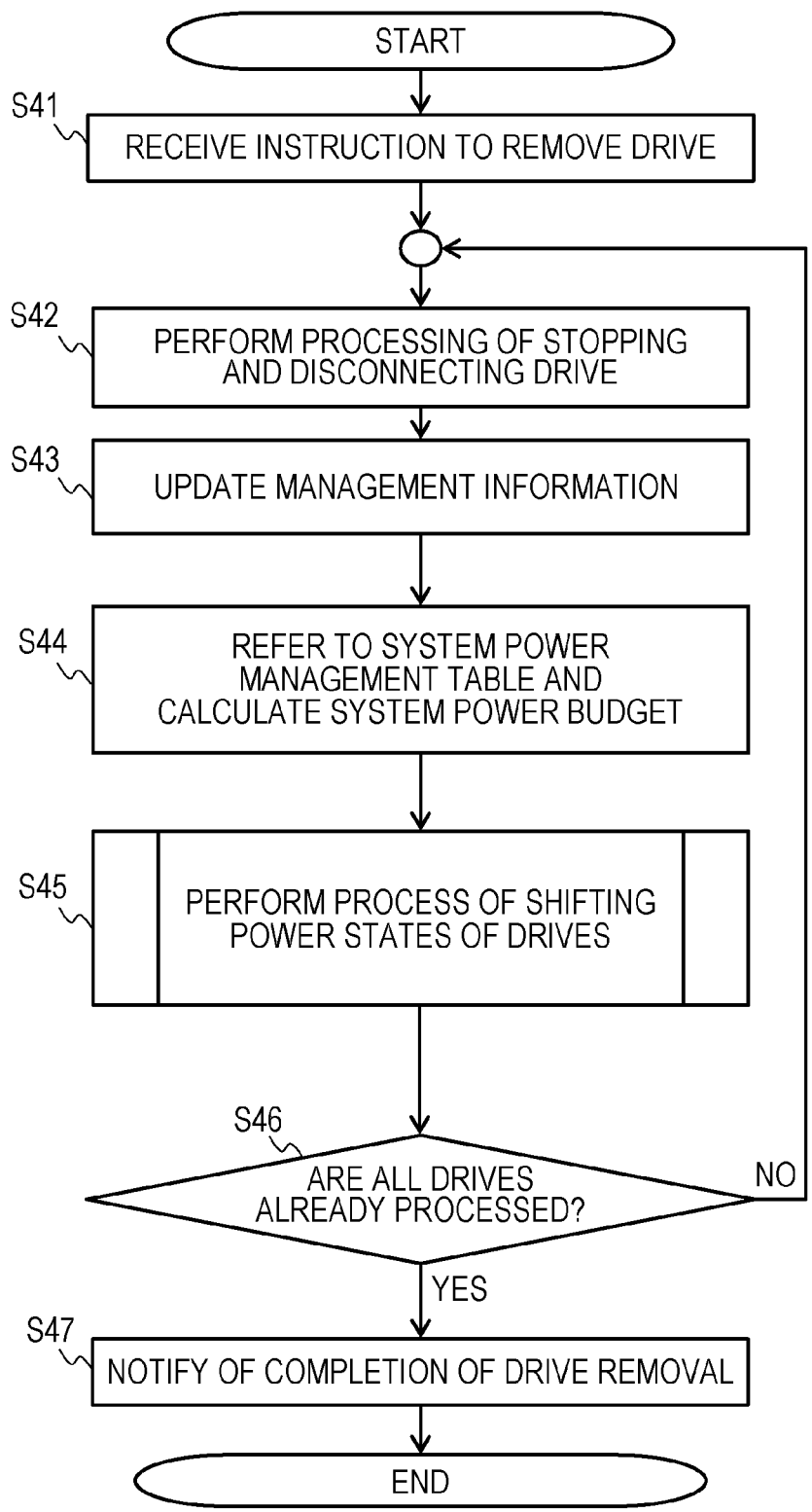
FIG. 6 is a flowchart of an example of a process to be performed by the storage controller for removal of a storage drive.

FIG. 6 is a flowchart of an example of a process to be performed by the storage controller 120 for removal of a storage drive. The CPU 130 receives an instruction to remove a drive from the user via the management terminal (not illustrated), for example (S41). The instruction to remove the drive specifies, for example, a position where the storage drive to be removed is mounted. Next, the CPU 130 selects one of storage drives 141 for which the instruction has been received, and performs processing of stopping and disconnecting the storage drive 141 (S42). As a result, the selected storage drive 141 can be safely removed.

Next, the CPU 130 updates the drive power management table 250 and the system power management table 300 according to the removal of the selected storage drive 141 (S43). Specifically, information of the storage drive at the corresponding mounting position in the drive power management table 250 is changed to null. In addition, information of the storage drive at the corresponding mounting position in the system power management table 300 is changed to null, inactive, and power consumption of 0 W.

Next, the CPU 130 calculates a power budget that can be supplied to the maintained storage drives 141 other than the storage drives 141 for which the removal instruction has been received (S44). A method of calculating the power budget is the same as or similar to the calculation method in step S12 in the flowchart of FIG. 5.

Next, the CPU 130 performs a process of shifting the power states of the maintained storage drives 141 other than the storage drives 141 for which the removal instruction has been received (S45). Details of the process of shifting the power states of the storage drives in S45 will be described later.

Next, the CPU 130 determines whether the processing has been performed on all the storage drives 141 specified by the removal instruction (S46). When a storage drive 141 remains unprocessed (S46: NO), the process returns to step S42. When all the storage drives 141 for which the removal instruction has been received are completely processed (S46: YES), the CPU 130 notifies the management device of the completion of the process of removing the storage drives (S47).

Next, an example of a power control process for removal of a storage controller of the storage system 100 will be described. The storage system 100 determines the power states of the storage drives 141 according to the removal of the storage controller 120. It is possible to perform appropriate power control according to the removal of the storage controller. By removing the storage controller 120, power consumption is reduced, and at the same time, the number of operating fans is reduced. Therefore, in Example 1 of the present specification, the power states of the storage drives 141 are changed to a power state with lower power consumption if necessary from the viewpoint of the amount of heat generated. In another example, a power state with the highest power consumption within the upper limit determined from the power consumption and the amount of heat generated may be selected.

Figure 7:
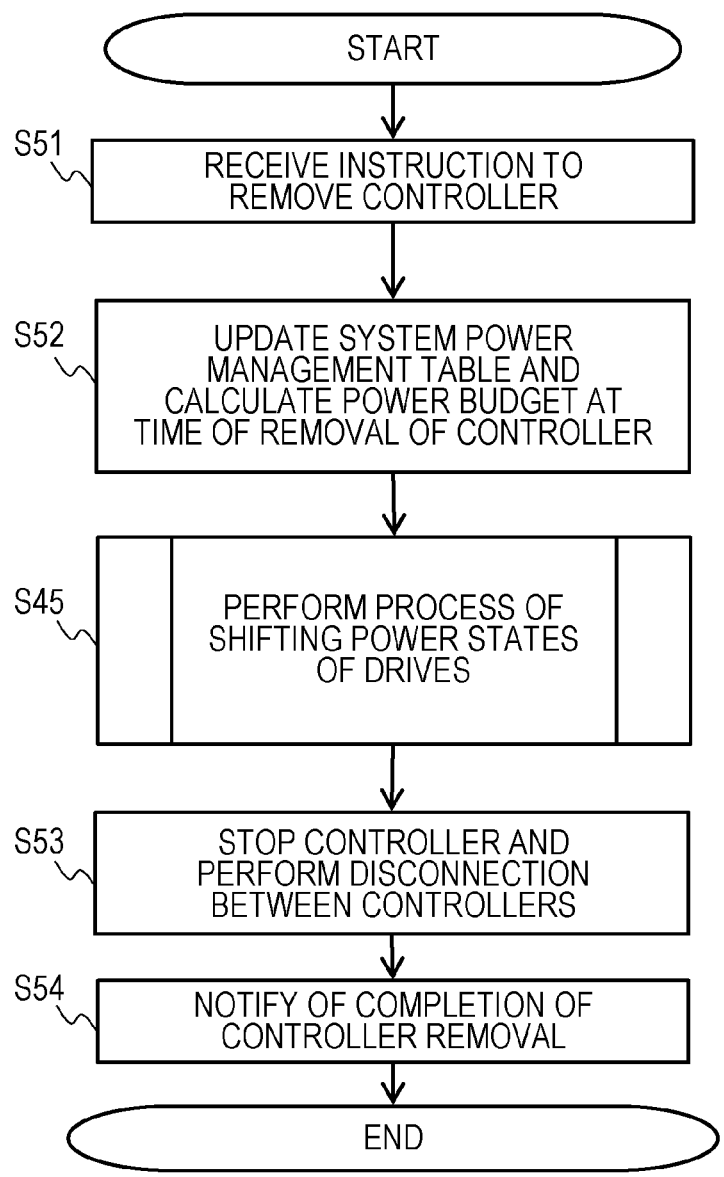
FIG. 7 is a flowchart of an example of a process to be performed by a remaining storage controller for removal of a storage controller.

FIG. 7 is a flowchart of an example of a process to be performed by a remaining storage controller 120 for removal of a storage controller. The CPU 130 receives an instruction to remove a storage controller from the user via the management terminal (not illustrated), for example (S51). Here, it is assumed that one storage controller is removed. When a plurality of storage controllers are removed, the process illustrated in FIG. 7 may be repeatedly performed. The instruction to remove the storage controller specifies, for example, a position where the storage controller 120 to be removed is mounted.

Next, the CPU 130 updates the system power management table 300 and calculates a power budget that can be supplied to the storage drives 141 (S52). Information of all the devices of the storage controller 120 at corresponding mounting positions in the system power management table 300 is changed to null, inactive, and power consumption of 0 W. The calculated power budget may be, for example, the power budget based on the amount of heat generated as described in step S12 in the flowchart of FIG. 5. In another example, the power budget based on the power consumption and the amount of heat generated as described in step S12 may be used.

Next, the CPU 130 performs the process of shifting the power states of the storage drives 141 (S45). Details of the process of shifting the power states of the storage drives in S45 will be described later.

Next, the CPU 130 performs processing of stopping the storage controller for which the instruction has been received and disconnecting the storage controller from the remaining storage controller (S53). As a result, the storage controller 120 can be safely removed. Finally, the CPU 130 notifies the management device of the completion of the process of removing the storage controller (S54).

Next, an example of a power control process for addition of a storage controller of the storage system 100 will be described. The storage system 100 determines the power states of the storage drives 141 according to the addition of a storage controller 120. It is possible to perform appropriate power control according to the addition of the storage controller. By adding the storage controller 120, power consumption and the number of operating fans increase. The storage system 100 determines the power states of the storage drives 141 from the viewpoint of the power consumption and the amount of heat generated. For example, by setting the highest power state within the allowable range, the performance of the storage system 100 can be improved.

Figure 8:
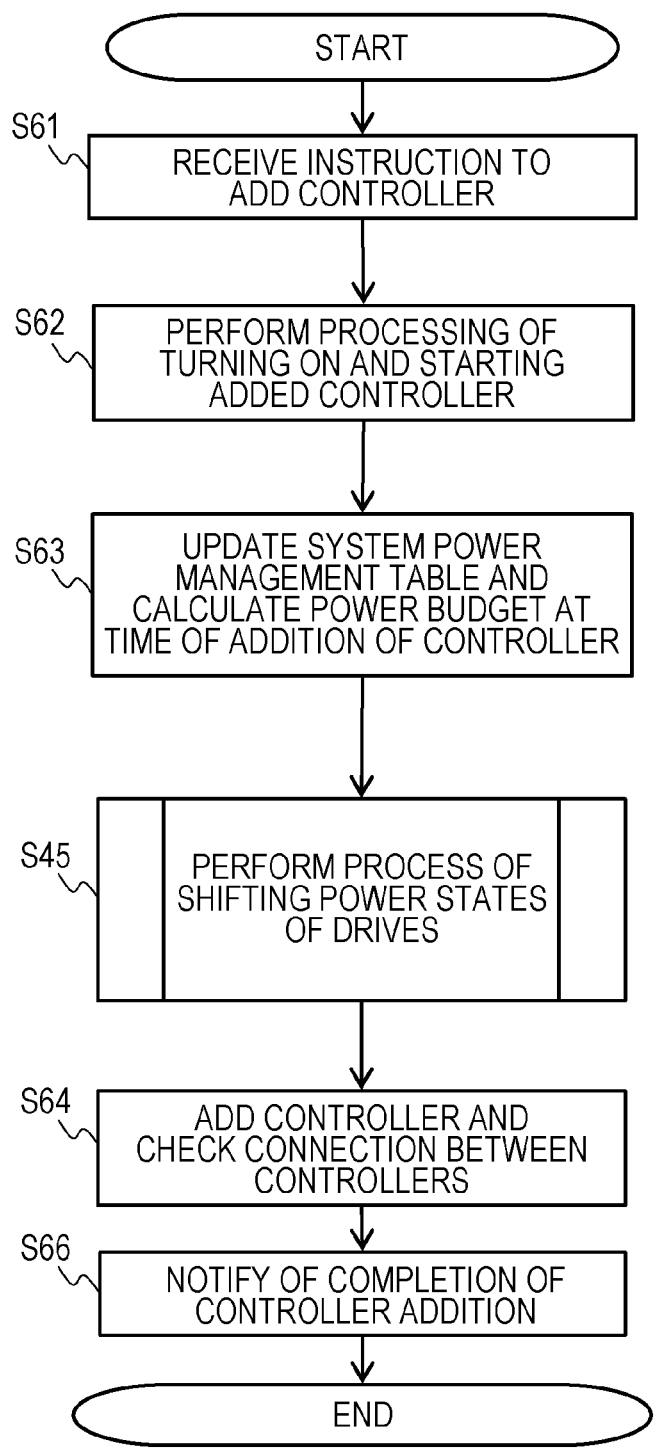
FIG. 8 is a flowchart of an example of a process to be performed by an existing storage controller for addition of a storage controller.

FIG. 8 is a flowchart of an example of a process to be performed by the existing storage controller 120 for addition of a storage controller. The CPU 130 receives an instruction to add a storage controller from the user via the management terminal (not illustrated), for example (S61). Here, it is assumed that one storage controller is added. When a plurality of storage controllers are removed, the process illustrated in FIG. 8 may be repeatedly performed. The instruction to add the storage controller specifies, for example, a position where the storage controller 120 to be added is mounted.

Next, the CPU 130 performs processing of turning on and starting the added storage controller (S62). Next, the CPU 130 updates the system power management table 300 and calculates a power budget that can be supplied to the storage drives 141 (S63). Information of all the devices of the storage controller 120 added is registered in the system power management table 300. A method of calculating the power budget is the same as or similar to the calculation method in step S12 in the flowchart of FIG. 5.

Next, the CPU 130 performs the process of shifting the power states of the storage drives 141 (S45). Details of the process of shifting the power states of the storage drives in S45 will be described later. Next, the CPU 130 performs processing of adding the storage controller and checking connection between the storage controllers (S64). As a result, the added storage controller 120 can normally operate in the storage system 100. Finally, the CPU 130 notifies the management device of the completion of the process of adding the storage controller (S66).

Next, an example of a power source control process when a failure of a fan 134 or a power source 102 occurs in the storage system 100 will be described. The storage system 100 determines the power states of the remaining storage drives 141 in response to a failure of a fan 134 or a power source 102. For example, the storage system 100 changes the power states of the storage drives 141 to a power state with lower power consumption in response to the failure of the fan or the power source. As a result, the operation of the storage system 100 can be maintained.

Figure 9:
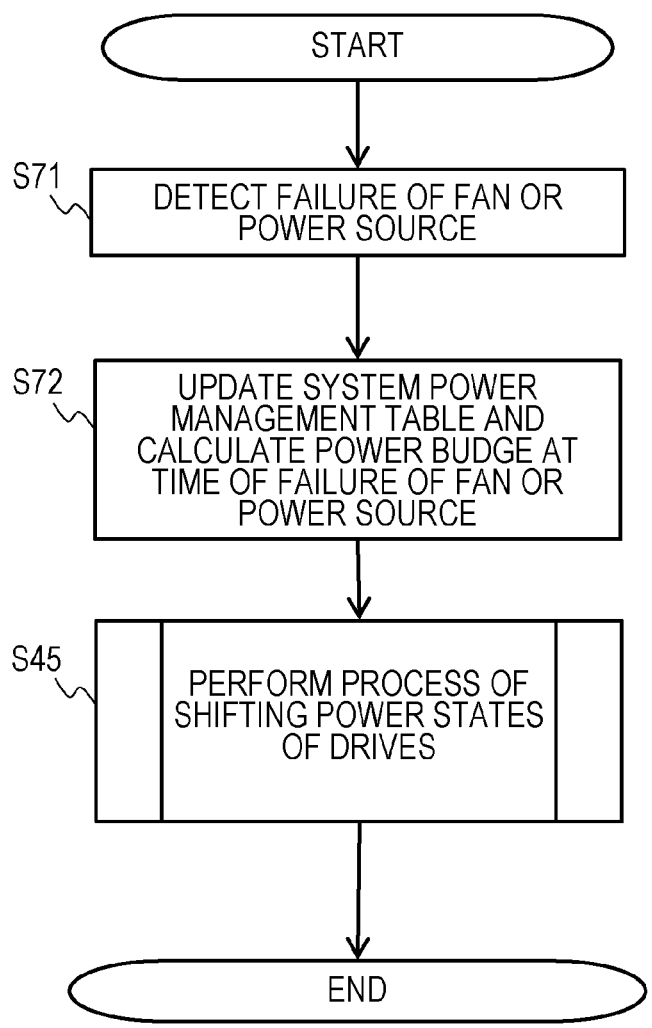
FIG. 9 is a flowchart of an example of a process to be performed by a storage controller at the time of a failure of a fan or a power source.

FIG. 9 is a flowchart of an example of a process to be performed by a storage controller 120 at the time of the failure of the 134 fan or the power source 102. It is possible to perform appropriate power control when the fan 134 or the power source 102 fails. The CPU 130 monitors the operation of the fans 134 and the operation of the power source 102. When the failure of the fan 134 or the power source 102 is detected (S71), the CPU 130 updates the system power management table 300 and calculates a power budget that can be supplied to the storage drives 141 (S72).

Information of the fan 134 or the power source 102 at the corresponding mounting position in the system power management table 300 is changed to null, inactive, and power consumption of 0 W. A method of calculating the power budget may be the same as or similar to the calculation method in step S12 in the flowchart of FIG. 5.

Next, the CPU 130 performs the process of shifting the power states of the storage drives 141 (S45). Details of the process of shifting the power states of the storage drives in S45 will be described later. This process ends after step S45.

Next, an example of a power source control process for the replacement of the failed fan 134 or the failed power source 102 in the storage system 100 will be described. It is possible to perform appropriate power control for the replacement of the fan 134 or the power source 102. The storage system 100 determines the power states of the storage drives 141 according to the replacement of the failed fan 134 or the failed power source 102. For example, the storage system 100 changes the power states of the storage drives 141 to a power state with higher power consumption according to the replacement of the failed fan or the failed power source. As a result, the performance of the storage system 100 can be improved.

Figure 10:
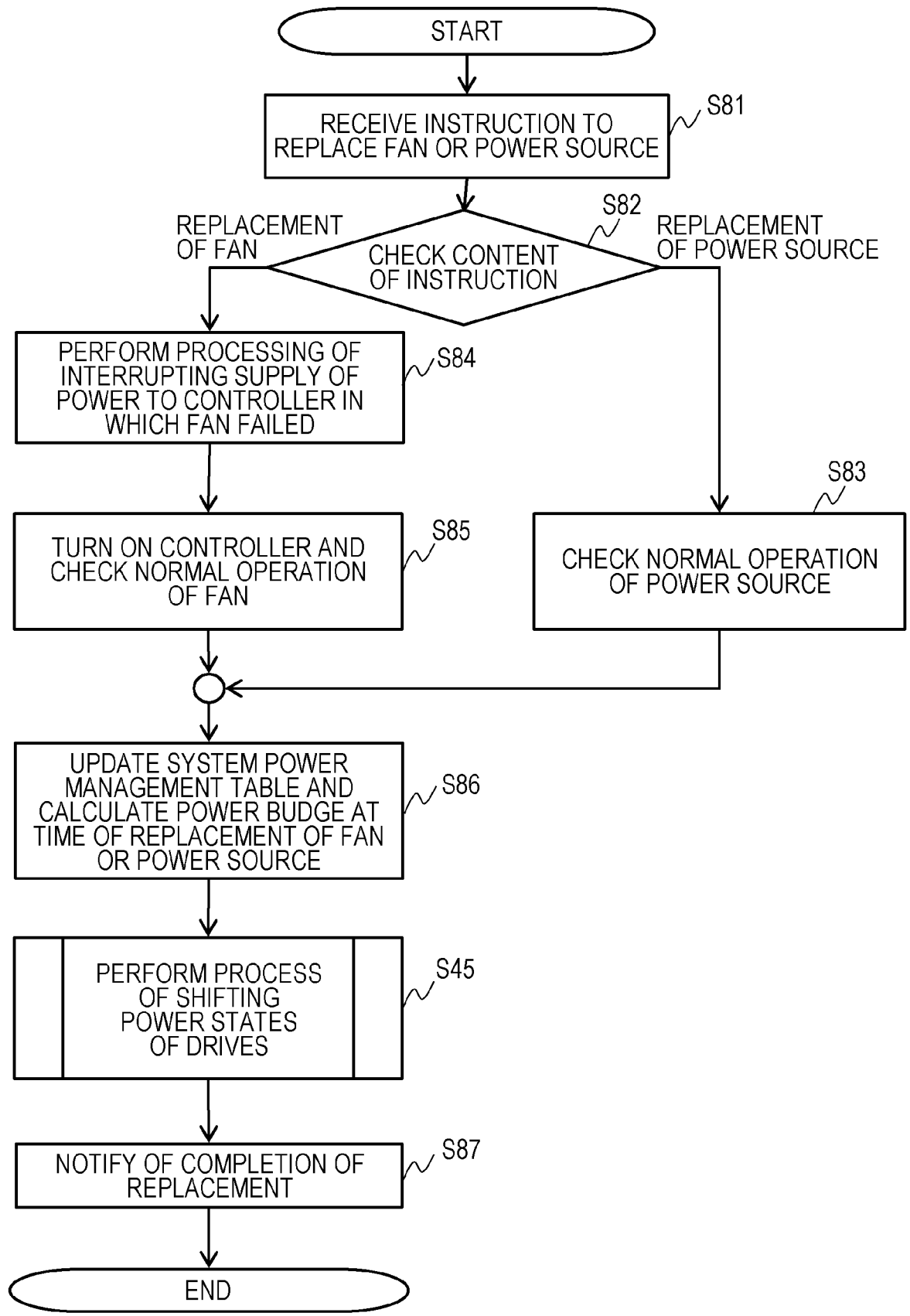
FIG. 10 is a flowchart of an example of a process to be performed by a storage controller for replacement of a fan or a power source.

FIG. 10 is a flowchart of an example of a process to be performed by the storage controller 120 for replacement of the fan or the power source. The CPU 130 receives an instruction to replace the fan or the power source from the user via the management terminal (not illustrated), for example (S81). In this case, it is assumed that one fan or power source is replaced. When a plurality of fans or power supplies are replaced, the process illustrated in FIG. 10 may be repeatedly performed. The instruction to replace the fan or the power source specifies, for example, a position where the fan or power source to be replaced is mounted.

Next, the CPU 130 checks the contents of the instruction and determines which of the fan and the power source is to be replaced (S82). When the instruction is to replace the power source (S82: replacement of power source), the CPU 130 performs a process of checking the operation of a power source with which the failed power source has been replaced (S83).

When the instruction is to replace the fan (S82: replacement of fan), the CPU 130 performs a process of interrupting supply of power to the storage controller 120 in which the fan has failed (S84). After the replacement of the fan, the CPU 130 turns on the storage controller 120 and performs a process of checking the operation of a fan with which the failed fan has been replaced (S85).

After the normal operation of the replaced device is checked in step S83 or S85, the CPU 130 updates the system power management table 300 and calculates a power budget that can be supplied to the storage drives 141 (S86). Information of the replaced fan or power source is updated in the system power management table 300. A method of calculating the power budget is the same as or similar to the calculation method in step S12 in the flowchart of FIG. 5.

Next, the CPU 130 performs the process of shifting the power states of the storage drives 141 (S45). Details of the process of shifting the power states of the storage drives in S45 will be described later. Finally, the CPU 130 notifies the completion of the replacement of the fan or power source (S87).

Figure 11:
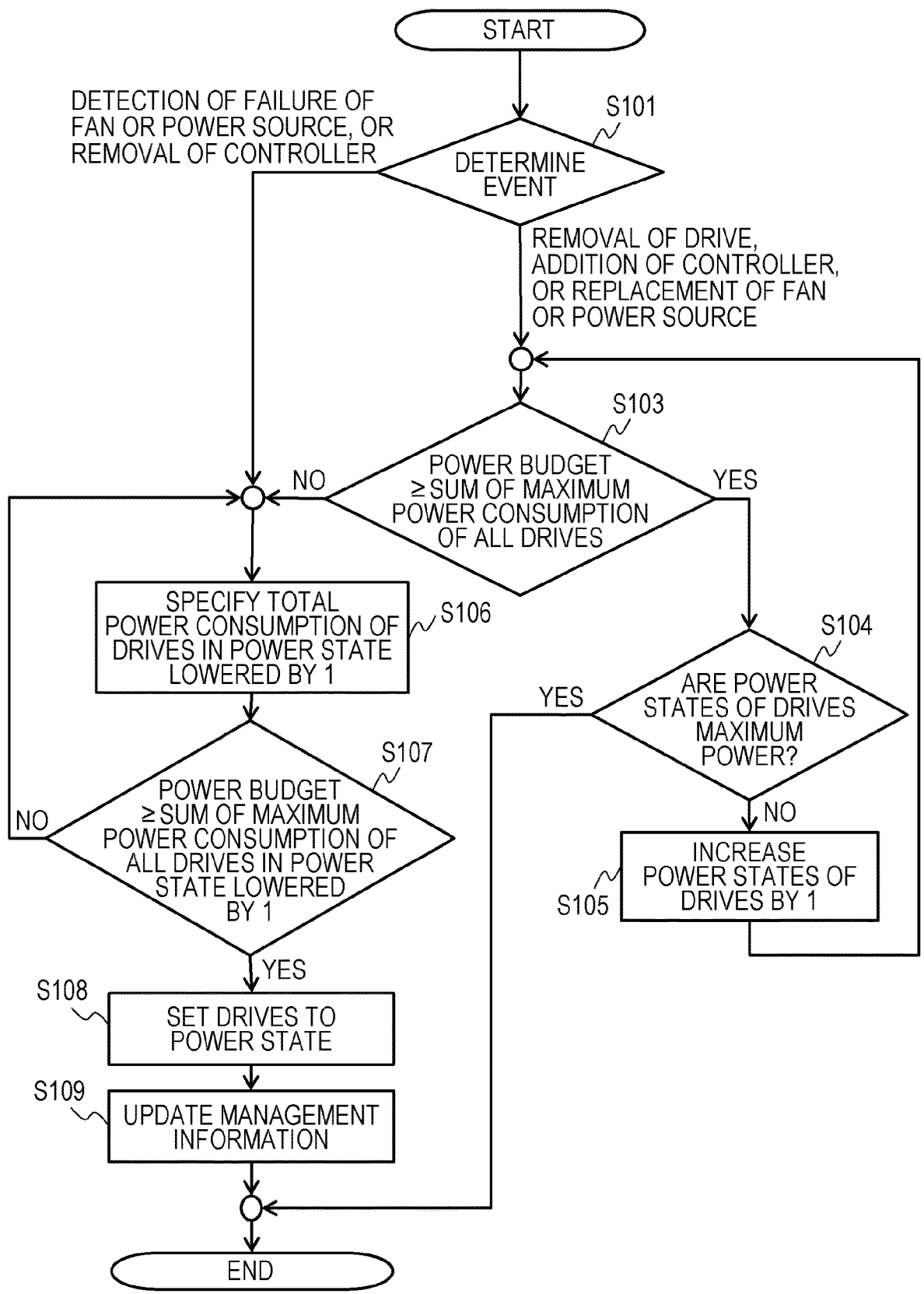
FIG. 11 is a flowchart of an example of a process of shifting power states of storage drives.

Next, details of the process of shifting the power states of the storage drives in S45 will be described later. As described above, the process of shifting the power states of the storage drives in S45 is performed in each of the power control processes described with reference to FIGS. 6 to 10. FIG. 11 is a flowchart of an example of the process of shifting the power states of the storage drives in S45.

First, the CPU 130 determines an event that has occurred (S101). When the event is the removal of a storage drive, the addition of a storage controller, or the replacement of a fan or a power source, the CPU 130 refers to the drive power management table 250 and calculates the current power states of operating storage drives 141 and the sum of the maximum power consumption of the operating storage drives 141. The CPU 130 compares the sum of current power consumption of the operating storage drives 141 with the power budget (S103).

When the power budget is equal to or greater than the sum of the power consumption (S103: YES), the CPU 130 determines whether the current power states of the storage drives 141 are a state (power state "0") of consuming the maximum power (S104). As described above, in this example, all the storage drives 141 are set to the common power state.

When the current power states of the storage drives 141 are the state (power state "0") of consuming the maximum power (S104: YES), this process ends. When the current power states of the storage drives 141 are not the state (power state "0") of consuming the maximum power (S104: NO), the CPU 130 increases the power states of the storage drives 141 by one, that is, decreases the numerical value indicating the power states by one (S105). Thereafter, the process returns to step S103.

In step S103, when the power budget is less than the sum of the power consumption (S103: NO), the flow proceeds to step S106. In a case where the event that has occurred is the detection of a failure of a fan or a power source or the removal of a storage controller in step S101, the process proceeds to step S106.

In step S106, the CPU 130 specifies the total power consumption of the storage drives 141 in a power state (with a number that is one larger than the number of the current power state) one step lower than the current power state. By referring to the power state definition table group 200, the CPU 130 can recognize the maximum power consumption of each storage drive 141 in the power state one step lower than the current power state.

The CPU 130 compares the power budget for all the storage drives 141 with the sum of the maximum power consumption in the power state in which the power state of all the storage drives 141 is lowered by one step (S107). When the power budget is less than the sum of the maximum power consumption in the power state lowered by one step (S107: NO), the process returns to step S106.

When the power budget is equal to or greater than the sum of the maximum power consumption in the power state lowered by one step (S107: YES), the CPU 130 sets the power state in all the storage drives 141 (S108) and updates the management information (S109). Specifically, the information of the storage drives 141 indicated in the drive power management table 250 and the system power management table 300 is updated.

As described above, a fan failure or the removal of a controller lowers the cooling capacity of the storage system 100 for cooling the storage drives and the CPUs. Therefore, by reducing the power of the storage drives, it is possible to suppress the occurrence of a failure due to insufficient heat discharge. In addition, since a failure of a power source halves the power that can be supplied, the power consumption of the entire system can be reduced by reducing the power of the storage drives, and the power source can be prevented from being overloaded. In other events, the power consumption of the storage drives is calculated to increase the power state so that the maximum performance within the power budget is achieved.

As described above, by performing power control of the storage drives according to the number of storage drives and the number of fans, power that can be supplied to the other components including the CPUs is secured. By securing the power for the CPUs to operate in the high-performance mode, a decrease in the performance of the entire storage system due to a decrease in the performance of the storage drives is suppressed.

In the above-described example of the process, by changing the power state of the storage drives 141 one by one, the storage drives 141 are set to the power state with the maximum power consumption within the power budget, that is, the power state with the highest performance. As a result, it is possible to achieve both low power consumption and high performance.

Example 2

Hereinafter, Example 2 of the present specification will be described. In Example 2, in a process of shifting the power states of the storage drives, power control is performed according to prespecified required performance. As a result, power consumption can be reduced while satisfying the performance required by a user within a possible range.

FIG. 12 illustrates an example of a configuration of a drive power management table 400 according to Example 2 of the present specification. The drive power management table 400 is an extended management table in which performance information of the storage drives is added to the drive power management table 250.

The drive power management table 400 includes a mounting position field 401, a device ID field 402, an available power state field 403, a current power state field 404, a current average power consumption field 405, a current maximum power consumption field 406, a maximum read performance field 407, a maximum write performance field 408, a read latency field 409, and a write latency field 410.

Information indicated in the mounting position field 401, the device ID field 402, the available power state field 403, the current power state field 404, the current average power consumption field 405, and the current maximum power consumption field 406 is the same as or similar to information indicated in the mounting position field 251, the device ID field 252, the available power state field 253, the current power state field 254, the current average power consumption field 255, and the current maximum power consumption field 256 illustrated in FIG. 3, respectively.

The maximum read performance field 407, the maximum write performance field 408, the read latency field 409, and the write latency field 410 indicate the maximum read performance (throughput), the maximum write performance (throughput), the minimum read latency, and the minimum write latency of the storage drives 141, respectively. The read performance, the write performance, the read latency, and the write latency of each storage drive 141 in each power state can be known from the information of the drive power management table 400 and information of a power state definition table group 200.

Figure 13:
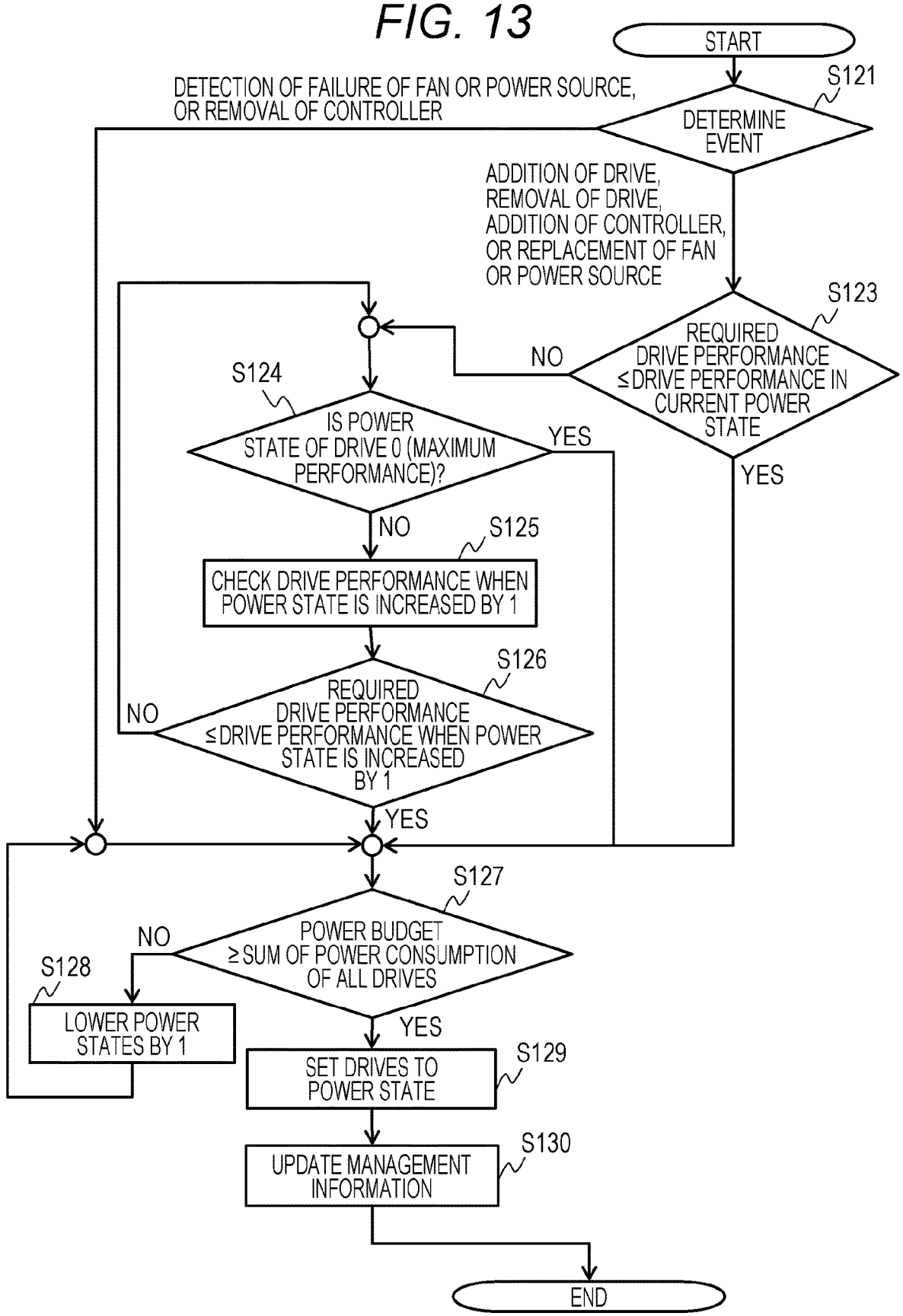
FIG. 13 is a flowchart of an example of a process of shifting power states of storage drives according to Example 2.

FIG. 13 is a flowchart of an example of the process of shifting the power states of the storage drives according to Example 2. Unlike the process of shifting the power states of the storage drives as illustrated in FIG. 11, power control is performed so as to satisfy the prespecified required performance. The required performance may be represented by, for example, a value calculated from a part, all, or at least a part of the maximum read performance, the maximum write performance, the read latency, and the write latency. In addition, it is assumed that a power budget that can be supplied to all the storage drives 141 has already been calculated before the execution of the flowchart of FIG. 13.

First, the CPU 130 determines an event that has occurred (S121). When the event is the addition of a storage drive, the removal of a storage drive, the addition of a storage controller, or the replacement of a fan or a power source, the CPU 130 refers to the drive power management table 400 and compares the performance of a storage drive 141 having the lowest performance among all the storage devices 141 with the required drive performance (S123). In this case, it is assumed that the power states of all the storage drives 141 (including the added drive) are common.

When the performance of the storage drive in the current power state is equal to or higher than the required drive performance (S123: YES), the process proceeds to step S127. Details of step S127 will be described later. When the storage drive performance in the current power state is less than the required drive performance (S123: NO), the CPU 130 determines whether the current power state of the storage drive 141 is "0", that is, a power state with the maximum performance and the maximum power consumption (S124).

When the current power state is the power state with the maximum performance (S124: YES), the process proceeds to step S127. Details of step S127 will be described later. When the current power state is not the power state with the maximum performance (S124: NO), the CPU 130 refers to the drive power management table 400 and the power state definition table group 200 to check the storage drive performance when the power state is increased by one step, that is, when the power state number is decreased by 1 (S126).

When the storage drive performance at the time of increasing the power state by one step is less than the required drive performance (S126: NO), the process returns to step S124. As described above, the storage drive performance to be compared is the lowest performance of all the storage drives 141. When the storage drive performance at the time of increasing the power state by one step is equal to or greater than the required drive performance (S126: YES), the process returns to step S127.

In a case where the event that has occurred is the detection of a failure of a fan or a power source or the removal of a storage controller in step S121, the process proceeds to step S127. In step S127, the CPU 130 compares the power budget indicating the power that can be supplied to all the storage drives 141 with the sum of the power consumption of all the storage drives 141 (S127). The power states of the storage drives 141 are a current power state of an operating storage drive 141 or a power state that is one or more steps higher than the current power state (S125).

When the power budget is less than the sum of the power consumption of all the storage drives 141 (S127: NO), the CPU 130 lowers the power states of the storage drives 141 by one step (S128), and compares the power budget with the sum of the power consumption of all the storage drives 141 again (S127).

When the power budget is equal to or greater than the sum of the power consumption of all the storage drives 141 (S127: YES), the CPU 130 sets the power state in all the storage drives 141 (S129) and updates the management information (S130).

Specifically, the information of the storage drives 141 indicated in the drive power management table 400 and the system power management table 300 is updated. As described above, in the power control process described in Example 2, the storage drives 141 are set to a power state that is within the power budget and closest to the prespecified required performance. As a result, it is possible to achieve both required performance and low power consumption.

Note that the present invention is not limited to the above-described Examples and includes various modifications. For example, Examples have been described in detail for easy understanding of the present invention, and are not necessarily limited to those having all the described configurations. In addition, a part of the configuration described in a certain Example can be replaced with the configuration described in the other Example, and the configuration described in a certain Example can be added to the configuration described in the other Example. In addition, for a part of the configuration of each Example, addition, removal, and replacement of other configurations can be applied alone or in combination.

In addition, some or all of the above-described configurations, functions, processing units, processing means, and the like may be implemented by hardware, for example, by designing with an integrated circuit. In addition, each of the above-described configurations, functions, and the like may be implemented by software by a processor interpreting and executing a program for implementing each function. Information such as a program, a table, and a file for implementing each function can be stored in a storage device such as a memory, a hard disk, and a solid state drive (SSD), or a recording medium such as an IC card, an SD card (SD is a registered trademark), or a DVD (DVD is a registered trademark).

In addition, the control lines and the information lines indicate lines considered to be necessary for the description, and do not necessarily indicate all control lines and information lines of the product. In practice, it may be considered that almost all the configurations are connected to each other.

What is claimed is:

1. A power control method in a storage system, wherein the storage system holds power management information for managing power consumption of an operating mounted device of the storage system, and definition information for defining a relationship between power states and power consumption of a plurality of storage drives, and the power control method comprises:

determining a power budget that can be supplied to the plurality of storage drives, based on the power management information according to a change in a configuration of the storage system;

determining a power state of each of the plurality of storage drives based on the power budget and the definition information;

managing a relationship between the power states and performance; and setting, based on the power management information, the plurality of storage drives to a power state that is within the power budget and closest to a prespecified required performance.

2. A storage system comprising:

a storage controller;

one or more cooling fans; and a plurality of storage drives, wherein the storage controller is configured to:

hold power management information for managing power supplied to the storage system and power consumption of an operating mounted device of the storage system, and definition information for defining a relationship between power states and power consumption of the plurality of storage drives;

determine a power budget that can be supplied to the plurality of storage drives, based on the power management information according to a change in a configuration of the storage system;

determine a power state of each of the plurality of storage drives based on the power budget and the definition information; and wherein the storage controller determines a power budget that can be supplied to the plurality of storage drives, based on a configuration of the one or more cooling fans.

3. The storage system according to claim 2, wherein the storage controller sets the plurality of storage drives to a common power state.

4. The storage system according to claim 2, wherein the storage controller sets the plurality of storage drives to a power state with the maximum power consumption within the power budget.

5. The storage system according to claim 2, wherein the change in the configuration is addition of one or more storage drives, and the plurality of storage drives include existing storage drives and the one or more added storage drives.

6. The storage system according to claim 2, wherein the change in the configuration is removal of one or more storage drives, and the plurality of storage drives are storage drives remaining after the one or more storage drives are removed.

7. The storage system according to claim 2, wherein
the change in the configuration is an increase or a decrease in the number of the one or more cooling fans, and
the storage controller changes the power states of the plurality of storage drives to a power state with higher power consumption according to the increase in the number of the one or more cooling fans, and changes the power states of the plurality of storage drives to a power state with lower power consumption according to the decrease in the number of the one or more cooling fans.

8. The storage system according to claim 2, further comprising a plurality of storage controllers including the storage controller, wherein
each of the plurality of storage controllers includes one or more cooling fans, and
the change in the configuration is a decrease or a increase in the number of the plurality of storage controllers.

9. The storage system according to claim 2, wherein
the storage controller determines the power budget so as to secure power for the storage controller to operate in a high-performance mode.

10. A storage system comprising:
a storage controller; and
a plurality of storage drives, wherein
the storage controller is configured to:
hold power management information for managing power supplied to the storage system and power consumption of an operating mounted device of the storage system, and definition information for defining a relationship between power states and power consumption of the plurality of storage drives;
determine a power budget that can be supplied to the plurality of storage drives, based on the power management information according to a change in a configuration of the storage system; and
determine a power state of each of the plurality of storage drives based on the power budget and the definition information;
wherein
the power management information further manages a relationship between the power states and performance, and
the storage controller sets, based on the power management information, the plurality of storage drives to a power state that is within the power budget and closest to prespecified required performance.

* * * * *